United States Patent Office 3,558,775
Patented Jan. 26, 1971

3,558,775
THERAPEUTICAL COMPOSITION CONTAINING
MERCAPTO-BENZIMIDAZOLES
Etienne Fournier, Paris, France, assignor to Laboratoires
Cassenne, Paris, France, a French body corporate
No Drawing. Filed Feb. 29, 1968, Ser. No. 709,215
Claims priority, application France, Mar. 7, 1967,
97,671
Int. Cl. A61k 27/00
U.S. Cl. 424—232                                    10 Claims

ABSTRACT OF THE DISCLOSURE

The invention relates to a therapeutical composition having in particular an anti-inflammatory and anti-pyretic activity and a depressant activity on the central nervous system, characterized in that it comprises, as active ingredient, a compound of formula:

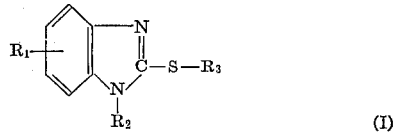

(I)

wherein $R_1$ is a hydrogen or halogen atom, $R_2$ is hydrogen, an acyl group or an alkyl group, and $R_3$ is hydrogen or a lower alkyl group, an acyl group, a —$CH_2$—COOH group, a $\beta$-di-loweralkyl-amino-loweralkyl group, a N-morpholino or N-piperidino group, or a pharmaceutically acceptable acid addition salt of said compound or a quaternary ammonium salt of said compound, and a therapeutically administrable vehicle.

---

The present invention has for its object a therapeutical composition having, in particular, an anti-inflammatory and an anti-pyretic acivity, and a depressant activity on the central nervous system, characterized in that it comprises, as active ingredient, a compound of formula:

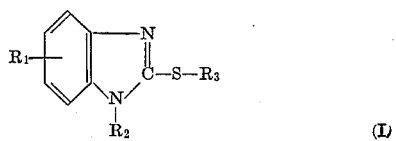

(I)

wherein $R_1$ is a hydrogen or halogen atom, $R_2$ is hydrogen, an acyl group or an alkyl group and $R_3$ is hydrogen or a lower alkyl, acyl, —$CH_2$—COOH, $\beta$-diloweralkyl-aminoloweralkyl, N-morpholino or N-piperidino group, or a pharmaceutically acceptable acid addition salt of said compound or a quaternary ammonium salt of said compound, and a therapeutically administrable vehicle.

In the present description and claims, the term "lower alkyl" designates groups having 1 to 6 carbon atoms inclusive.

Included in the above compounds are particularly those in which $R_1$ is a hydrogen or chlorine atom, $R_2$ is hydrogen or a benzoyl or acetylsalicyloyl group and $R_3$ is hydrogen or a methyl, acetyl, benzoyl, acetylsalicyloyl, $\alpha$-ethanoic acid, $\beta$-dimethylaminoethyl, $\beta$-diethylaminoethyl, N-morpholino or N-piperidino group.

Typical examples of quaternary ammonium salts are, particularly, the methiodide and especially 2-mercapto-benzimidazole methiodide.

To prepare the compounds of Formula I, a phenylene diamine of formula:

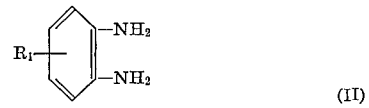

(II)

wherein $R_1$ has the above defined meaning, is first reacted with carbon disulfide, thereby obtaining the derivative of formula:

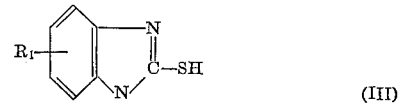

(III)

and then, if desired, introducing at positions 1 and 2 the respective substituents $R_2$ and $R_3$ desired in this derivative.

The reaction between o-phenylene diamine and carbon disulfide is advantageously carried out in an alcoholic medium, in the presence of an alkali metal hydroxide. The product is recrystallized from an aqueous acetic acid solution.

To obtain compounds of Formula I in which $R_2$ and/or $R_3$ is an acyl group, the compound of Formula III is reacted with a suitable acylating agent such as an acid chloride or anhydride.

To prepare the compounds of Formula I in which $R_3$ is a lower alkyl group, the compound of Formula III is reacted with a suitable alkylating reagent such as an alkyl sulfate, for example.

To prepare the compounds in which $R_3$ is the

—$CH_2$—COOH group, the compound of Formula III is reacted with a haloacetic acid, such as bromoacetic, for example.

The compounds of Formula I in which $R_3$ is a $\beta$-diloweralkyl-amino-loweralkyl group are prepared by reacting the compound of Formula III with a di-loweralkyl-amino-$\beta$-chloro-loweralkane, preferably as its hydrochloride.

The compounds of Formula I in which $R_3$ is a N-morpholino or N-piperidino group are obtained by reacting the compound of Formula III with morpholine or piperidine in alkaline medium, the resulting solution being then treated with iodine and an alkali metal iodide.

The non limiting examples which follow illustrate the preparation of a number of compounds useful as active ingredient in the composition.

EXAMPLE 1.—2-MERCAPTO-BENZIMIDAZOLE

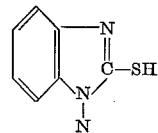

A mixture of 0.3 mole of o-phenylene diamine, 0.339 mole of potassium hydroxide, 0.34 mole of carbon disulfide, 300 ml. of 95% alcohol and 45 ml. of water is heated to refluxing. The mixture is refluxed during three hours, 12 g. of vegetable carbon are added thereto, refluxing is maintained during 10 minutes and the mixture is then filtered.

The filtrate is maintained at 70° C., 300 ml. of water are again added at 70° C. followed by a slow addition, with stirring, of a mixture of 25 ml. of acetic acid and 50 ml. of water.

The entire resulting material is maintained at low temperature (4° C.) during 8 hours, and the crystals are filtered off. The product is washed with water and dried. Yield: 84–86.5% of theoretical.

The product is obtained as cream coloured platelets having a slight sulfide odour and an extremely bitter taste. The product is very sparingly water-soluble, poorly soluble in ethanol and methanol, and soluble in acetone.

An alcohol solution of the compound gives, with silver nitrate, a strong canary-yellow precipitate, and, with copper sulfate, an abundant green precipitate.

Elemental analysis.—Calculated for $C_7H_6N_2S$ (percent: C, 56; H, 4; N, 18.66; S, 21.33. Found (percent): C, 55.7; H, 4.2; N, 18.4. Melting point: 291° C.

$E_{1cm}^{1\%}$ : alcohol at 306 mμ: 1,900; 0.1 N NaOH at 296 mμ: 1,300

EXAMPLE 2.—1:2-DIBENZOYL-2-MERCAPTO-BENZIMIDAZOLE

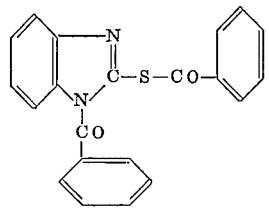

One mole of 2-mercapto-benzimidazole is suspended in 2 litres of anhydrous toluene. Using a dropping funnel, 6 moles of benzoyl chloride are added thereto. The flask is maintained in an ice-cold bath. The reaction mixture is stirred during one hour at room temperature and is then refluxed during 8½ hours. The toluene and excess benzoyl chloride are distilled off, to give a yellow material which is then recrystallized from a 50% methanol-water mixture. The desired derivative is obtained with a yield of about 66%, as yellow needles of very low bulk density, of slightly aromatic odour and which are practically tasteless. The melting point is 204° C.

EXAMPLE 3.—1:2-DIACETYLSALICYLOYL-2-MERCAPTO-BENZIMIDAZOLE

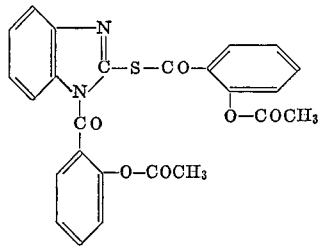

0.1 mole of 2-mercapto-benzimidazole is suspended in 500 ml. of anhydrous toluene, 0.6 mole of acetylsalicylic acid chloride is added thereto, while maintaining the reaction medium in an ice bath. The reaction mixture is refluxed during 8½ hours and, after cooling, the product is filtered, washed with pure toluene, then with benzene and finally with acetone.

The desired product is obtained with a yield of about 93% in the form of canary-yellow crystals, M.P. 237–239° C., that are both odourless and tasteless.

EXAMPLE 4.—2-N-MORPHOLINO-MERCAPTO-BENZIMIDAZOLE

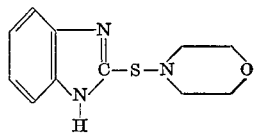

A mixture is prepared containing 0.06 mole of 2-mercaptobenzimidazole, 100 ml. of water, 0.12 mole of caustic soda pellets dissolved in 100 ml. of water and 0.18 mole of morpholine. The volume is brought to about 250 ml. with distilled water. A clear solution is obtained.

A mixture of 15.3 g. of iodine and 33 g. of potassium iodide in 200 ml. of water is then added thereto. The addition takes about 1 hour. After the addition is complete, the reaction mixture is stirred during one hour at room temperature, and the product is then filtered, washed, dried and recrystallized from ethyl acetate.

The product is obtained in the form of white fluffy micro-needles which have a slight iodine-like odour, which are tasteless but leave a very bitter after-taste. The product decomposes at about 240° C.

EXAMPLE 5.—2-MERCAPTO-BENZIMIDAZOLE METHIODIDE

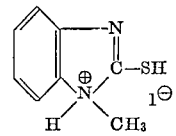

0.05 mole of 2-mercapto-benzimidazole are dissolved in 200 ml. of glacial acetic acid. 0.05 mole of methyl iodide is added thereto. The reaction mixture is then refluxed during 2 hours: an abundant precipitate forms, and is then filtered, washed, dried and recrystallized.

The product is obtained as white micro-crystals having a very bitter taste, M.P. 238–240° C.

EXAMPLE 6.—5-CHLORO-2-MERCAPTO-BENZIMIDAZOLE

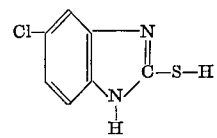

A mixture of 0.3 mole of 4-chloro-o-phenylenediamine, 0.339 mole of potassium hydroxide, 0.34 mole of carbon disulfide, 300 ml. of 95% alcohol and 45 ml. of water is heated to refluxing. The mixture is refluxed during 3 hours and is then filtered.

Water and acetic acid are added to the filtrate. After cooling, filtering and washing, the resulting product is obtained in the form of an amorphous light brown powder melting between 270 and 300° C., with decomposition.

EXAMPLE 7.—2-β-DIMETHYLAMINOETHYL-MERCAPTO-BENZIMIDAZOLE HYDROCHLORIDE

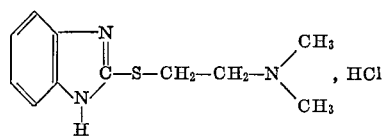

0.258 mole of 2-mercapto-benzimidazole is dissolved in in 450 ml. of anhydrous pyridine. 0.542 mole of caustic soda pellets and 0.284 mole of dimethylamino-β-chloroethane hydrochloride are added thereto. The reaction mixture is brought to boiling and a device is adapted for the separation of the positive azeotrope pyridine-water which distills, as it is formed. The heating time is about 3.5 hours.

Excess pyridine is distilled under reduced pressure. There remains a brown viscous residue which is taken up into 200 ml. of water. A beige precipitate forms. After chilling, this is filtered, washed and dried. This gives 2-β-dimethyl aminoethyl-mercapto-benzimidazole which is converted into hydrochloride by treatment with an aqueous HCl solution.

A product in the form of needles, having a bitter and burning taste, M.P. 183° C., is obtained with a yield of about 80%.

EXAMPLE 8.—S-ACETYL-2-MERCAPTO-BENZIMIDAZOLE

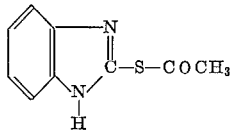

0.3 moles of 2-mercapto-benzimidazole is dissolved in 500 ml. of anhydrous pyridine, and 0.3 mole of acetic anhydride are added thereto, while maintaining the reaction medium in an ice-cold bath. The temperature is gradually increased to refluxing, and refluxing is maintained during 20 minutes. After cooling, the reaction mixture is poured into a large excess of ice-water (≈5 litres), and is then filtered and washed, and the resulting product is successively recrystallized from chloroform and benzene.

Microscopic odourless and tasteless crystals are obtained in the form of white needles, M.P. 213° C. (Koeffler), with a yield of about 84%.

EXAMPLE 9.—2-β-DIETHYLAMINOETHYL-MERCAPTO-BENZIMIDAZOLE

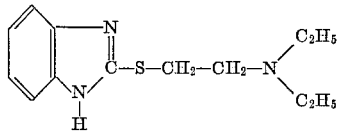

0.3 mole of 2-mercapto-benzimidazole is dissolved in 500 ml. of anhydrous pyridine. 0.63 mole of caustic soda pellets, followed by 0.33 mole of diethylamino-β-chloro-ethane hydrochloride are added thereto. Since this is an exothermic process, the reaction mixture is stirred during 3 hours, without any heat supply.

The excess pyridine is distilled under reduced pressure and the reaction mixture is poured into a large excess of water (≈1.5 litre). After cooling, the material is filtered, washed and dried. The product is recrystallized from a 50% ethanol-water mixture, to give cream-coloured rod-like crystals which are odourless and tasteless, melting at 106° C. The yield is about 80%.

EXAMPLE 10.—S-BENZOYL-2-MERCAPTO-BENZIMIDAZOLE

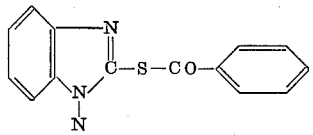

0.03 mole of 2-mercapto-benzimidazole is dissolved in 50 ml. of anhydrous pyridine. 0.033 mole of benzoyl chloride are added thereto, while maintaining the reaction medium in an ice-cold bath. When the addition is complete, the reaction mixture is refluxed during one hour.

The resulting brown solution is poured into a large excess of water (300 ml.). After cooling, filtering, washing, the resulting product is dried and is then recrystallized from benzene.

Microscopic odourless and tasteless crystals, M.P. 210° C., are obtained in the form of white needles. Yield is about 76%.

EXAMPLE 11.—S-METHYL-2-MERCAPTO-BENZIMIDAZOLE

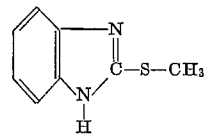

0.03 mole of 2-mercapto-benzimidazole are added to an aqueous solution of 0.0315 mole of sodium hydroxide. 0.03 mole of dimethyl sulfate is added thereto. The reaction medium is maintained in an ice-cold bath during 15 minutes, and is then stirred during 2 hours at room temperature, and is then refluxed during 2 hours.

After cooling, the resulting material is filtered, washed, dried and recrystallized from benzene.

The proudct is obtained in the form of odourless white prismatic crystals having a very slightly anesthetizing taste. Melting point is 206° C., and the yield is about 70%.

EXAMPLE 12.—2-N-PIPERIDINO-MERCAPTO-BENZIMIDAZOLE

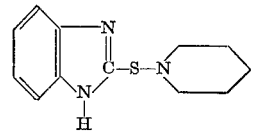

A mixture is prepared containing 0.06 mole of 2-mercapto-benzimidazole, 100 ml. of water, 0.12 mole of caustic soda pellets dissolved in 100 ml. of water, and 0.18 mole of piperidine. The volume is brought to about 250 ml. with distilled water, and a clear solution is thereby obtained.

A mixture of 15.3 g. of iodine and 33 g. of potassium iodine in 200 ml. of water is added thereto. Addition takes about one hour. After the addition is complete, the reaction mixture is stirred during one hour at room temperature, and is then filtered and washed until the pH is neutral, and the resulting product is then dried and recrystallized from benzene.

An odourless and tasteless product is obtained in the form of white or slightly cream-coloured micro-crystals, melting at about 198° C. (with sublimation), with a yield of about 70%; the product is soluble in H+ solutions and in ether, it is poorly soluble in ethanol, methanol, acetone and benzene, and is insoluble in water.

Elemental analysis.—Calculated, for $C_{12}H_{15}N_3S$ (percent): C, 61.8; H, 6.43; N, 18.02; S, 13.73. Found (percent): C, 62.1; H, 6.4; N, 17.9; S, 13.7.

$E_{1\,cm.}^{1\%}$: chloroform at 291 mμ: 564, dimethylformamide at 292 mμ: 495

$E_{1\,cm.}^{1\%}$: N hydrochloric acid at 242–243 mμ: 650, at 299 mμ: 850

EXAMPLE 13.—S[α-ETHANOIC ACID]-2-MERCAPTO-BENZIMIDAZOLE

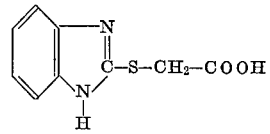

In a 250 ml. flask are added 6.9 g. (0.05 mole) of bromoacetic acid, 7.5 g. (0.05 mole) of 2-mercapto-benzimidazole and 150 ml. of water; the reaction mixture is refluxed during 4 hours and is then placed in the refrigerator; 11 g. of white crystals are collected. Melting point: 215° C.

The compound may be recrystallized from water. The product is soluble in alkaline solutions.

The composition according to the invention is administrable by the oral, rectal or vaginal, parenteral or topical routes.

For such various forms of administration, it is formulated as tablets, capsules, syrups, suppositories, ovules, injectable suspensions or solutes, creams or ointments, etc.

In tablets and capsules, the active ingredient is associated with the usual excipients, diluents or lubricants such as starch, polyvinylpyrrolidone, magnesium stearate, lactose, talc, potato starch, sugar, and the like. Each unit dose contains about 0.1 to 1 g. of active ingredient.

In suppositories or ovules, each unit dose contains about 0.1 to 1 g., for example, of active ingredient, the latter being combined with the usual vehicles such as cocoa butter, synthetic excipients, waxes, and the like.

The injectable suspensions or solutes contain the active ingredient in dissolved form or suspended in an aqueous or oily liquid, or in the form of an emulsion, together with the usual adjuncts, surface-active agents, and the like. Each unit dose may contain 0.1 to 2 g. of active ingredient.

In syrups, for which each unit dose may be from 0.05 to 2 g., the active ingredient is dissolved or suspended in an aqueous or non-aqueous vehicle containing, if desired, sweetening or flavouring agents, and the like.

The creams or ointments contain advantageously from 0.1 to 5% by weight of active ingredient dissolved or dispersed, incorporated into fatty or non-fatty excipients, emulsified or as a single phase, the emulsions being of oil-in-water or of water-in-oil type. Useful excipients include vaseline, lanolin, waxes, vaseline oils, spermaceti, polysorbates, triglycerides, water, and the like.

The administrable dosage varies with the case to be treated; for example, it may be between 100 mg. and 2 g. of active principle per unit dose.

To illustrate the therapeutical properties of the compounds constituting the active ingredient of the composition according to the invention, the results of a toxicological, pharmacological and clinical investigation carried out on two representative tablets of the series, 2-mercapto-benzimidazole and 2 - N - piperidino-mercapto-benzimidazole, will be set forth below.

I.—TOXICOLOGICAL INVESTIGATION

[Toxicity was determined in rats and mice. The following $LD_{50}$ values were obtained]

|  | 2-mercapto-benzimidazole | 2-N-piperidino-mercapto-benzimidazole |
|---|---|---|
| $LD_{50}$ in rats (per os) mg./kg. | 259.5 | 852.5 |
| $LD_{50}$ in mice: |  |  |
| Per os mg./kg. | 445.5 |  |
| I.p. route mg./kg. | 200 | #350 |
| S.c. route mg./kg. | 420 | >2,000 |

The absence of histologically detectable chronic injuries was noted.

(II) Pharmacological investigation (1) Psychopharmacological investigation.—This investigation was carried out with 2-mercapto-benzimidazole.

The tests carried out involved:

(a) motility
(b) equilibrium and muscular power
(c) aggressivity
(d) narcosis potentiation
(e) morphine-induced restlessness
(f) the anti-convulsant effect
(g) electroshock
(h) conditioned reflexes.

It was concluded therefrom that 2-mercapto-benzimidazole:

(1) is a central nervous system depressant in rats, at high dosage levels ($\frac{1}{10}$ and $\frac{1}{5}$ of $LD_{50}$);
(2) causes no loss of equilibrium in mice at dosage levels of $\frac{1}{5}$, $\frac{1}{10}$ and $\frac{1}{25}$ of $LD_{50}$;
(3) reduces the ability of mice to heave themselves up when suspended by the fore-paws to a horizontal wire dosage levels used: $\frac{1}{5}$, $\frac{1}{10}$ and $\frac{1}{25}$ of $LD_{50}$);
(4) at $\frac{1}{10}$ of $LD_{50}$, reduces the activity and combativeness of rats submitted to a nociceptive stimulation;
(5) potentiates secobarbital- and amobarbital-induced narcosis in mice. Its action is markedly lower with pentobarbital (dosage levels used: $\frac{1}{5}$ and $\frac{1}{25}$ of $LD_{50}$);
(6) reduces the morphine-induced restlessness in mice (dosage levels used: $\frac{1}{5}$, $\frac{1}{10}$ and $\frac{1}{25}$ of $LD_{50}$);
(7) has no anti-convulsant ability in mice—strychnine- or cardiazol-induced convulsions—(dosage levels used: $\frac{1}{5}$, $\frac{1}{10}$ and $\frac{1}{25}$ of $LD_{50}$);
(8) is without effect on electroshock in rats, when induced by an alternating current (dosage levels used: $\frac{1}{5}$ and $\frac{1}{10}$ of $LD_{50}$).

(2) Anti-inflammatory investigation.—In the experiments described below, a comparative investigation was carried out with known anti-inflammatory drugs.

Oedema of the paw (1) In kaolin-induced oedema of the paw, 2-mercapto-benzimidazole is slightly more active, at a dosage level of 50 mg./kg., then phenylbutazone at 100 mg./kg.
(2) In serotonine-induced oedema of the paw, 2-mercapto-benzimidazole, at a dosage level of 50 mg./kg., is as active as acetylsalicylic acid at a dosage of 150 mg./kg.
(3) In viscarine-induced oedema of the paw, 2-mercapto-benzimidazole is about 10 times less active than indomethacine; however, it should be noted that it is 5 times less toxic.

$LD_{50}$ (per os), in rat: 2-mercapto-benzimidazole: 259.5 mg./kg., indomethacine: 50 mg./kg.

N-piperidino-2-mercapto-benzimidazole was found active on kaolin-induced oedema, on serotonine-induced oedema and on formalin-induced oedema; it is also very active on formalin-induced peritonitis in rat.

(3) Anti-pyretic investigation.—This investigation, effected in particular with 2-N-piperidino-mercapto-benzimidazole, has shown that this compound has a marked anti-pyretic action on propidon-induced hyperthermia in guinea-pig (the product was administered intraperitoneally, as a suspension, 2.5 hours after injection of the propidon); in mice, a decrease of 1.4° C. was noted at a dosage level corresponding to $\frac{1}{5}$ of $LD_{50}$.

(III) Clinical investigation

For the clinical investigation, 2-mercapto-benzimidazole was administered as test product. Some case reports are set forth below for illustrative purposes.

CASE REPORT NO. 1

Mrs. R . . . , 75 years old, housewife. Patient suffering from a characterized condition of psycho-motor restlessness, with insomnia, rhythmic movements, incoherent elocution. However, 50 mg. daily of levopromazine produced a good equilibrium.

This treatment is stopped, inducing a return of the spells of restlessness: the patient is no longer relaxed, disturbs her bedding continuously, sings, etc. Administration of 2-mercapto-benzimidazole, at the daily dosage of 300 mg., during 15 days. The patient is found to calm down gradually, with normal sleep during the night, and is quiet during the day. The treatment is perfectly well tolerated.

CASE REPORT NO. 2

Mr. D . . ., 40 years old. Hypernervosism together with a depressive condition which disturb substantially the patient's social life. Treatment with 2-mercapto-benzimidazole at a dosage of 200 mg. daily and then of 300 mg. daily, during 4 and 8 days, respectively. When seen again at the end of the treatment, the patient declares he is satisfied. He feels more sure of himself and is able to sleep 8 hours per night. Treatment is very well tolerated.

CASE REPORT NO. 3

Miss S . . ., 26 years old, student, consults for a cervico-brachial neuralgia of medium intensity, without visible bone involvement, on X-ray. The patient is difficulty relieved with 2 Salgydal tablets (see Dictionnaire Vidal, 1963, p. 1638). Treatment: 400 mg. daily of 2-mercapto-benzimidazole during 8 days. The patient is marketdly relieved when seen after the treatment. She mentions, however, that the antalgic effect was obtained only 3 days after the beginning of the treatment. Good systemic tolerance of the drug.

CASE REPORT NO. 4

Mr. VER . . ., 43 years old, office employee. Myalgia of rheumatic origin, localized to both lower limbs. Treatment: 300 mg. daily of 2-mercapto-benzimidazole during 10 days. When seen after completion of the treatment, the patient declares that he suffers no longer, especially during walking motions. Good systemic tolerance of the drug.

CASE REPORT NO. 5

Mrs. C . . ., 48 years old, receptionist. The patient was operated on in 1961 for a discal hernia from which she does not suffer at present. However, she feels highly tired and depressed, and is irritable and anxious. She sleeps very badly. Treatment: 400 mg. daily of 2-mercapto-benzimidazole during 15 days. On completion of the treatment, the patient sleeps better, is no longer anxious at night. She feels much less tired. Good tolerance to the treatment.

CASE REPORT NO. 6

Mrs. M . . ., 65 years old, housewife, consults belatedly for a lumbago which occurred following a lifting effort. She suffers much and is unable to sleep at night. Treatment: 300 mg. daily of 2-mercapto-benzimidazole (3×100 mg. doses) during 8 days. Positive result: the pain has regressed and the patient recovered rapidly her normal movements. Sleep could then be established. The patient consults again for X-rays. No vertebral anomaly. Good tolerance to the treatment.

CASE REPORT NO. 7

Miss V . . ., 32 years old, consults for a dysmenorrhea during the first two days of the menses. Pains are intense and tenacious; they are accompanied by nausea and psychic instability, with irritability and crying fits. Treatment: 300 mg. daily of 2-mercapto-benzimidazole, during 8 days, the drug being administered 6 days prior to the expected date of the menses.

The result is positive both on the pains and on the psychic condition of the patient who is able to pursue her work normally whereas, previously, she was obliged to stay in bed during this period. Good systemic tolerance.

CASE REPORT NO. 8

Child M . . ., 6 months old, is brought to the consultation because she wakes up and screams at night since a few days. A manifest gingival hypertrophy is found, due to the fact he is cutting teeth (first lower median dens incisiva). Treatment: 100 mg. daily of 2-mercapto-benzimidazole during 5 days. The child is seen again on completion of the treatment. As early as the 2nd day of treatment, she ceased crying at night and her sleep reverted to normal. Disappearance of the gingival hypertrophy. Good tolerance to the treatment.

CASE REPORT NO. 9

Child O . . ., 8 years old, is admitted to the hospital because of a spell of acute articular rheumatism involving the left ankle, the right knee and the right shoulder. The child is then submitted to a treatment with 2-mercapto-benzimidazole, at a dosage of 150 mg. daily, during 8 days, together with complete rest.

Positive result where the articular pains are concerned. Reduced peri-articular swelling. In contrast, there is little influence on fever, so that the patient is submitted to corticotherapy.

CASE REPORT NO. 10

M. C . . ., 35 years old, employee. Sprained right ankle without bone injuries, which immobilizes the patient.

Treatment: 300 mg. daily of 2-mercapto-benzimidazole during 8 days. Rapid functional recovery with disappearance of the oedema and of the pain as early as the 3rd day of treatment. Good tolerance to the drug.

CASE REPORT NO. 11

Mr. P . . ., 50 years old, no profession, suffers from a spell of left scapulo-humeral periarthritis with some degree of functional disability, depending for a great part on the painful phenomena that may be caused by simple palpation of the inter-articular space and of the sub-deltoid serous bursa.

Treatment: 300 mg. daily of 2-mercapto-benzimidazole during 8 days. As early as the 6th day, marked improvement is noted; the articular pains have almost disappeared and angulations are substantially normal. Good tolerance of the treatment.

Having now described my invention what I claim as new and desire to secure by Letters Patent is:

1. Therapeutic composition having an anti-inflammatory, anti-pyretic and nervous central system depressant activity comprising, an active ingredient in unit dose form, wherein each unit dose contains about 0.05 to 2 g. of a member selected from the group consisting of compounds of formula:

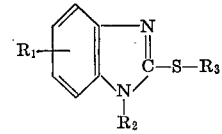

(I)

wherein $R_1$ is a member selected from the group consisting of a hydrogen atom and a halogen atom, $R_2$ is a member selected from the group consisting of hydrogen, and an acyl group, and $R_3$ is an acyl group, the pharmaceutically acceptable acid addition salts of said compounds and the quaternary ammonium salts of said compounds, with a therapeutically administrable vehicle.

2. Therapeutic composition as claimed in claim 1, wherein the active ingredient is S-acetyl-2-mercapto-benzimidazole.

3. Therapeutic composition as claimed in claim 1, wherein the active ingredient is S-benzoyl-2-mercapto-benzimidazole.

4. Therapeutic composition as claimed in claim 1, wherein the active ingredient is 1,2-diacetylsalicyloyl-2-mercapto-benzimidazole.

5. Therapeutic composition as claimed in claim 1, wherein the active ingredient is 1,2-dibenzoyl-2-mercapto-benzimidazole.

6. Therapeutic composition as claimed in claim 1, wherein each unit dose contains 0.1 to 1 g. of active ingredient with a vehicle for oral administration.

7. Therapeutic composition as claimed in claim 1, wherein each unit dose contains 0.1 to 1 g. of active ingredient with a vehicle for rectal administration.

8. Therapeutic composition as claimed in claim 1, wherein each unit dose contains 0.1 to 1 g. of active ingredient with a vehicle for vaginal administration.

9. Therapeutic composition as claimed in claim 1, wherein each unit dose contains 0.1 to 2 g. of active ingredient with a vehicle for parenteral administration.

10. Therapeutic composition having an anti-inflammatory activity, containing from 0.1 to 5 percent by weight of an active ingredient selected from a member of the group consisting of compounds of formula:

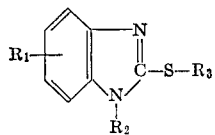

wherein $R_1$ is a member selected from the group consisting of a hydrogen atom and a halogen atom, $R_2$ is a member selected from the group consisting of hydrogen and an acyl group and $R_3$ is an acyl group, the pharmaceutically acceptable acid addition salts of said compounds and the quaternary ammonium salts of said compounds with a vehicle for topical administration.

References Cited

UNITED STATES PATENTS 3,424,845  1/1969  Berndt _____ 424—232

STANLEY J. FRIEDMAN, Primary Examiner

U.S. Cl. X.R.

424—248, 267, 273; 260—309.2